(12) United States Patent
Edington et al.

(10) Patent No.: US 10,468,689 B2
(45) Date of Patent: Nov. 5, 2019

(54) THERMAL BATTERY AND METHODS OF ACTIVATION

(71) Applicant: EAGLEPICHER TECHNOLOGIES, LLC, Joplin, MO (US)

(72) Inventors: Joe Don Edington, Joplin, MO (US); James J. Ferraro, Joplin, MO (US); Steven Brandon, Joplin, MO (US)

(73) Assignee: EaglePicher Technologies, LLC, Joplin, MO (US)

( * ) Notice: Subject to any disclaimer, the term of this patent is extended or adjusted under 35 U.S.C. 154(b) by 357 days.

(21) Appl. No.: 14/887,992

(22) Filed: Oct. 20, 2015

(65) Prior Publication Data

US 2017/0110737 A1    Apr. 20, 2017

(51) Int. Cl.
*H01M 6/38* (2006.01)
*H01M 6/50* (2006.01)

(52) U.S. Cl.
CPC ........... *H01M 6/38* (2013.01); *H01M 6/5088* (2013.01); *H01M 2220/20* (2013.01)

(58) Field of Classification Search
CPC ... H01M 6/38; H01M 6/5088; H01M 2220/20
See application file for complete search history.

(56) References Cited

U.S. PATENT DOCUMENTS

| | | | |
|---|---|---|---|
| 6,187,471 B1 | 2/2001 | McDermott et al. | |
| 2006/0201724 A1* | 9/2006 | Leblanc | F02N 11/0866 180/65.1 |
| 2012/0200250 A1 | 8/2012 | Rastegar | |
| 2012/0206084 A1 | 8/2012 | Rastegar | |

OTHER PUBLICATIONS

PCT International Search Report and Written Opinion dated Jan. 12, 2016 for International Application No. PCT/US15/58055.

* cited by examiner

*Primary Examiner* — Ula C Ruddock
*Assistant Examiner* — Frank A Chernow
(74) *Attorney, Agent, or Firm* — LSIP Law LLC; Linda Saltiel

(57) ABSTRACT

Some embodiments are directed to a dual activation mode thermal battery for powering a load. The thermal battery can include a first power source activable upon receiving mechanical energy. The thermal battery can also include a second power source activable through one of the electrical power produced by the first power source and external electrical stimuli, the second power source is configured to, upon activation provide a voltage for powering the load, wherein the first power source and the second power source are thermally and electrically isolated and the initiator thermal energy output from one initiator is prevented from initiating the other power source directly.

16 Claims, 5 Drawing Sheets

THERMAL BATTERY AND METHODS OF ACTIVATION

BACKGROUND

The disclosed subject matter relates to batteries. More particularly, the disclosed subject matter relates to thermal batteries, methods of activating thermal batteries, and methods of providing safety control signals.

A battery is a device that converts chemical energy into electrical energy. The battery is classified into two categories: a primary battery that is a non-rechargeable battery and a secondary battery that is a rechargeable battery. The batteries are used in various applications, such as automobiles, electrical devices, military applications, aerospace applications, etc. to provide electrical voltage. Each application has specific requirements and based on the requirements, an explicit type of battery is used. For example, for military purposes, batteries having longer battery life are needed, for electric automobiles, rechargeable batteries are required, etc. A key example of the primary battery is a thermal battery. Some applications require the need of having the primary battery for their operations, which irreversibly transform chemical energy to electrical energy. In addition, when reactants of the thermal battery are exhausted, energy is not re-stored in the thermal battery. The thermal battery provides various advantages, such as longer shelf life such as longer than few years, require less time for activation, etc. Once activated, the thermal battery supplies electrical power from a few seconds to an hour or longer. The characteristics of the thermal battery permit the use of the thermal battery in various applications.

SUMMARY

Thermal battery can be used in various military applications for weapon systems such as in the event of activating the weapon systems. The weapon systems include a variety of electrical components that require electrical power for their operations. In order to provide the electrical power to the weapon systems, thermal batteries are used. However, a number of problems are faced while activating the thermal battery in the weapon systems, as discussed in more detail below. In addition, some related arts do not provide sufficient power supply to the electrical components of the weapon systems.

In some related arts, the thermal battery can be activated by mechanical means. For example, in some related arts, a thermal battery used in weapon systems is activated mechanically by the act of dropping a munition or a weapon away from an aircraft wing. This action activates a striker that strikes a percussion primer, which further activates the thermal battery to supply the electrical voltage to the munition. However, the mechanical activation of the thermal battery by dropping the munition from the aircraft wing is not suitable in applications where the munition needs time to gather guidance information prior to release from the aircraft, such as in the case of GPS-guided munitions. In this situation, the battery is activated on the wing of the aircraft, typically using an electrically-fired igniter.

In addition, some munition systems use thermal battery activation to determine when it is safe to activate flight control systems to prevent the munition from affecting the flight performance of the aircraft or to prevent the munition from colliding with the aircraft. For example, time at which the thermal battery is activated is determined as time zero in a timing mechanism to activate a guided weapon system away from an aircraft after a predetermined amount of time.

In addition, in some cases, it is desirable for a munition system to have the capability for activation through both mechanical and electrical means to allow for the use of multiple guidance methods, such as being capable of both LASER- and GPS-guidance without requiring modifications to the munition safety system.

The configuration, size, shape, installation location and orientation, etc., of the thermal battery can be varied depending on the type of application, etc., to provide electrical power.

In order to provide enhanced outcomes, the thermal battery can also be configured and disposed in certain locations and orientations based on anticipated position of electrical components within the weapon systems, in which the thermal battery is to be installed.

It may be beneficial to provide a battery source to the weapon systems to provide sufficient amount of electrical voltage to the components of the weapon systems. However, providing a separate battery source may require an additional space in the weapon systems, and thus encroach on the amount of space used for other components.

It may therefore be beneficial to provide a dual activation mode thermal battery, and methods of use and manufacture thereof, that address at least one of the above issues. For example, it may be beneficial to provide a dual activation mode thermal battery while reducing encroachment on the amount of interior space used for other components within the guided weapon systems.

It may therefore be beneficial to provide methods and apparatus that address at least one of the above and/or other disadvantages. In particular, it may be beneficial to provide thermal batteries having both electrical and mechanical activation for activating weapon systems.

It may therefore be beneficial to provide methods and apparatus that address at least one of the above and/or other disadvantages. In particular, it may be beneficial to provide a dual activation mode thermal battery, as well as methods of activating a dual activation mode thermal battery, to allow the munition system to determine proximity with the carrying aircraft.

It may therefore be beneficial to provide methods and apparatus that address at least one of the above and/or other disadvantages. In particular, it may be beneficial to provide a dual activation mode thermal battery, as well as methods of activating a dual activation mode thermal battery without modification to aircrafts and/or weapon systems.

It may therefore be beneficial to provide methods and apparatus that address at least one of the above and/or other disadvantages. In particular, it may be beneficial to provide a dual activation mode thermal battery, as well as methods of activating a dual activation mode thermal battery to sense activation conditions for the weapon systems.

It may therefore be beneficial to provide methods and apparatus that address at least one of the above and/or other disadvantages. In particular, it may be beneficial to provide a dual activation mode thermal battery, as well as methods of activating a dual activation mode thermal battery to provide safety control signal to weapon systems even if the weapon system has been previously activated on the aircraft.

Some embodiments are therefore directed to a dual activation mode thermal battery for powering a load. The dual activation mode thermal battery can include a first power source that is activated by mechanical energy, such as by striking a percussion primer. The dual activation mode thermal battery also includes a second power source that is electrically-activated by either the first, mechanically-activated power source through an electrical connection between the first power source and the electrical igniter for the second power source or by external electrical stimuli, such as power provided from an aircraft. The second power source is configured to, upon activation provide a voltage for powering the munition system or components thereof. In the dual activation mode thermal battery, the first power source and the second power source are thermally and electrically isolated and the output from each ignition source (mechanically-initiated source and electrically-initiated source) are isolated from direct activation of the other power source.

Some other embodiments are directed to a dual activation mode thermal battery for powering a load. The dual activation mode thermal battery can include a first power source activable upon receiving thermal energy. The dual activation mode thermal battery can also include a second power source activable through one of the first power source and electrical stimuli, the second power source is configured to, upon activation, provide a voltage for powering the load. In the dual activation mode thermal battery, the first power source and the second power source are thermally isolated. The dual activation mode thermal battery can also include a plurality of electrodes electrically connected to the second power source, wherein the electrodes provide the voltage to the load.

Yet other embodiments are directed to a method of powering a load by a dual activation mode thermal battery. The method of powering a load by a dual activation mode thermal battery can include: activating a first power source upon receiving mechanical energy; and activating a second power source through one of the first power source or external electrical stimuli, the second power source is configured to, upon activation, provide a voltage for powering the load, wherein the first power source can function both as an activation path for the second power source and as a voltage signal to the safety system for the munition.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Dual Activation Mode Thermal Battery Housing Structure

Figure 1:
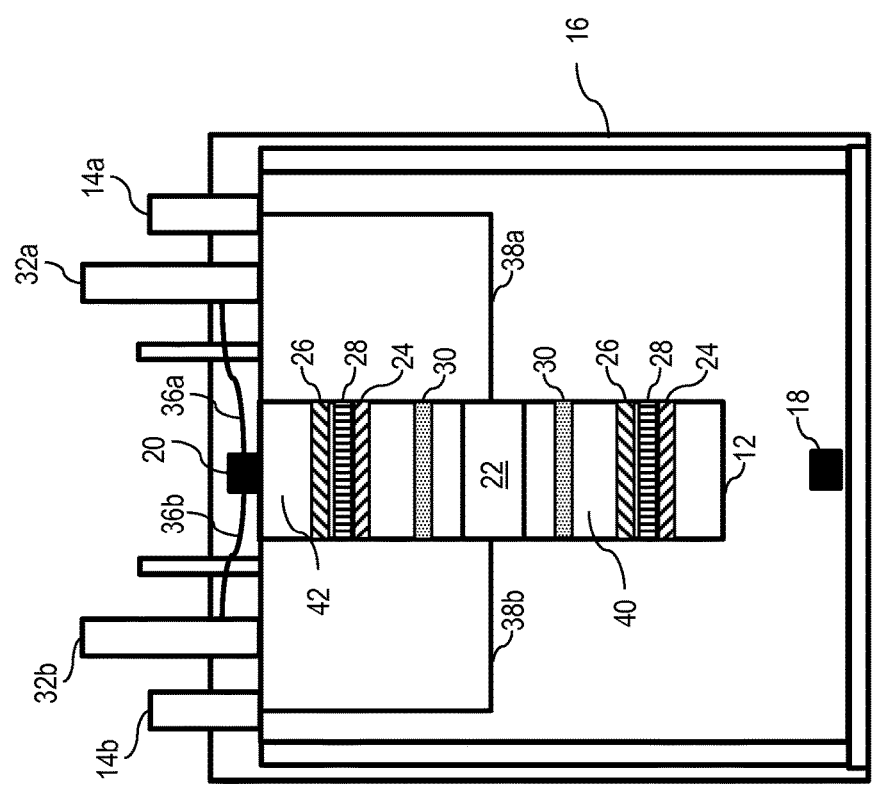
FIG. 1 is a schematic view of a dual activation mode thermal battery in accordance with the disclosed subject matter.

FIG. 1 is a schematic side view of a dual activation mode thermal battery 10 that can include a number of cells 12a-n (hereinafter referred to as cells 12), battery terminals 14a and 14b, a battery case 16, a first initiator 18, a second initiator 20, and an insulator 22. The insulator 22 can be used for providing thermal insulation, electrical isolation, and a separation of the igniter output from the opposing battery stacks between the cells 12 and the cells 42.

FIG. 1 illustrates a dual activation mode thermal battery 10, and embodiments are intended to include or otherwise cover a dual activation mode thermal battery (interchangeably referred to as thermal battery 10). In fact, embodiments are intended to include or otherwise cover configurations of the dual activation mode thermal battery 10 for use in any type of entity for example, an automobile, such as an aircraft, a truck, a boat, a ship, a spacecraft, a submarine, etc. In some other embodiments, the dual activation mode thermal battery 10 can be used in other non-vehicular applications, such as weapon systems, electronic devices, or any other situation where the dual activation mode thermal battery 10 can enhance outcomes subsequent to provide electrical voltage.

The exemplary dual activation mode thermal battery 10 can include the cells 12 arranged in a stack one over another. In fact, embodiments are intended to include or otherwise cover configurations of the cells 12 for providing higher electrical voltage. In some embodiments, the cells 12 can be arranged in a stack assembly, such as a 4-cell section 40 can include four cells. In certain embodiments, the cells 12 can be arranged in a stack assembly, such as 18-cell section can include 18 cells.

In alternative embodiments, the cells 12 can have number of cells in a range of three to five cells in a stack assembly and in a range of 16 to 20 cells in a stack assembly. In some embodiments, the cells 12 in the stack assembly can be connected in series. In alternate embodiments, the cells 12 in the stack assembly can be connected in parallel.

The cross section area of the cells 12 in the stack assembly is generally circular and therefore, the shape of the stack assembly of the cells 12 is cylindrical. However, embodiments are intended to include or otherwise cover any shape or form of the stack assembly in the dual activation mode thermal battery 10 with configurations that may be beneficial to stack multiple cells 12. Embodiments are intended to include or otherwise cover any shape or form of the dual activation mode thermal battery 10 with configurations that may be beneficial to stack multiple cells 12.

Each of the cells 12 can include a number of components, such as a positive electrode 24, a negative electrode 26, a separator 28 and a heat source 30. In some embodiments, the electrodes can be electrically connected to the 18-cell section of the dual activation mode thermal battery 10. The electrolyte in the thermal battery 10 is generally solid and inactive at room temperatures. In some embodiments, the dual activation mode thermal battery 10 can include molten salts as electrolytes of the separator 28.

In certain embodiments, the electrolytes can be made from a number of molten salt compositions. The positive electrode 24 can be made from a variety of materials, such as, but not limited to, lead chromate ($PbCrO_4$), potassium dichromate ($K_2Cr_2O_4$), calcium chromate ($CaCrO_4$), potassium chromate ($KCr_2O_2$), metal oxides such as vanadium pentoxide ($V_2O_5$) and tungsten trioxide ($WO_3$), and sulfides such as cupric sulfide ($CuS$), iron disulfide ($FeS_2$), cobalt disulfide ($COS_2$), etc.

In some embodiments, the negative electrode 26 can be produce by materials, such as, but not limited to, calcium metal, magnesium metal, lithium metal, lithium-aluminum or lithium-silicon alloys, etc.

In the embodiment shown in FIG. 1, the cells 12 are enclosed in the battery case 16. In some embodiments, the battery case 16 can be made up of, but not limited to, metal, steel, etc. In accordance with some embodiments, the shape of the battery case 16 is generally cylindrical having a diameter D and a height H. However, the shape of battery case 16 is shown in cylindrical in FIG. 1 for illustration purposes only, and the various embodiments are intended to include or otherwise cover any shape of battery case 16 that may be beneficial.

The dual activation mode thermal battery 10 can also include the first initiator 18. In some embodiments, the first initiator 18 can be disposed nearby the 4-cell section 40 of the dual activation mode thermal battery 10. In accordance with some embodiments, the first initiator 18 can be a primer (hereinafter referred to as primer 18). The primer 18 can be produced by using materials, such as, but not limited to, lead styphnate having barium nitrate, antimony trisulfide, powdered aluminum, tetrazene, etc.

In alternative embodiments, the primer 18 can be produced by using materials, such as lead azide, potassium perchlorate, or diazodinitrophenol (DDNP). In yet alternative embodiment, the primer 18 can also be produced by using lead free materials.

The primer 18 can be used to activate a first power source. The first power source can be a 4-cell section 40 of the dual activation mode thermal battery 10. In some embodiments, the primer 18 can be used to activate the 4-cell section 40 upon receiving thermal energy. The primer 18 can be struck through mechanical stimuli that explode the primer 18 and reacts chemically with explosive material within the primer 18 to produce the thermal energy. The thermal energy is further used to ignite the heat source 30 disposed within the dual activation mode thermal battery 10. In some embodiments, the primer 18 can be a primer used in a centerfire cartridge. In alternative embodiments, the primer 18 can be a primer used in a rimfire cartridge.

The dual activation mode thermal battery 10 can also include the second initiator 20. In some embodiments, the second initiator 20 can be disposed nearby a second power source. The second power source can be 18-cell section 42 of the dual activation mode thermal battery 10. The second initiator 20 can be used to activate the 18-cell section 42 of the dual activation mode thermal battery 10. In some embodiments, the second initiator 20 can be an electrical initiator or 'squib'(hereinafter referred to as squib 20).

The squib 20 is a miniature explosive device that can be used in a number of applications such as, but not restricted to, military applications, aerospace applications, space and satellite applications, etc. The squib 20 in the dual activation mode thermal battery 10 can be provided with squib terminals 32a and 32b. In some embodiments, the squib terminals 32a and 32b can be electrical terminals. The squib terminals 32a and 32b can be connected to squib leads 36a and 36b. In certain embodiments, the squib leads 36a and 36b can be located adjacent to the thermal battery terminals 14a and 14b. The squib terminals 32a and 32b are connected to the squib 20 by using the squib leads 36a and 36b. The squib leads are connected electrically with in the squib using a bridgewire. In some embodiments, the bridge wire can be an electrical wire. The squib 20 can also be used for shattering and/or propelling a variety of explosive materials. In certain embodiments, when an electric voltage produced by the first power source is applied to the squib terminals 32a and 32b, the squib 20 initiates and generates thermal energy. The thermal energy is then used to ignite the heat source 30 within the 18-cell section 42 of the dual activation mode thermal battery 10. The ignition of the heat source 30 can activate electrolyte of the separator 28 in the cells 12 in order to activate the 18-cell section of the dual activation mode thermal battery 10. Further, electrical voltage produced by the cells 12 can be delivered to the squib terminals 32a and 32b.

In some embodiments, conductors 38a and 38b can be used to connect the battery terminals 32a and 32b with the cells 12. For example, the conductor 38a can be used to connect the battery terminal 32a with the cells 12 and the conductor 38b can be used to connect the battery terminal 32b with the cells 12.

II. Actuation of the Dual Activation Mode Thermal Battery

Figure 2:
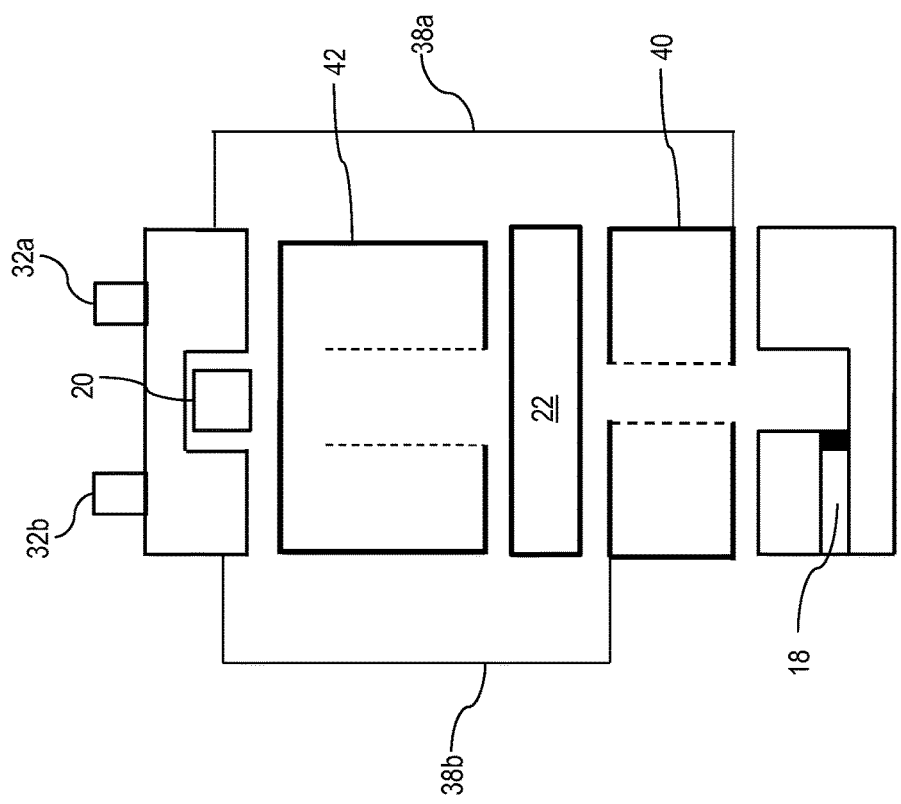
FIG. 2 is a schematic view of cells in the dual activation mode thermal battery in accordance with the disclosed subject matter.

FIG. 2 is perspective view of the cells in the thermal battery 10. The thermal battery 10 is a dual activation mode thermal battery 10. In certain embodiments, the dual activation mode thermal battery 10 can include the 4-cell section 40 and the 18-cell section 42. The 4-cell section 40 and the 18-cell section 42 of the dual activation mode thermal battery 10 can be activated in a number of ways. In some embodiments, 4-cell section 40 of the dual activation mode thermal battery 10 can be activated upon receiving mechanical energy. In some embodiments, the 4-cell section 40 of the dual activation mode thermal battery 10 can be activated by mechanically striking the primer 18, which explodes the primer 18. The explosion of the primer 18 further generates thermal energy that is used to ignite the heat source 30 within the 4-cell section 40.

In alternative embodiments, the 4-cell section 40 of the dual activation mode thermal battery 10 can be activated by pulling a lanyard. For example, a mechanical device (not shown) can include a firing pin that can be struck by manually pulling a lanyard using a pull ring. In some other embodiments, the 4-cell section 40 of the dual activation mode thermal battery 10 can be activated mechanically by dropping a load away from an entity, which further activates the primer 18. The entity can be, but not limited to, an aircraft, submarine, a military vehicle, etc. When the load having the dual activation mode thermal battery 10 is dropped away from the entity, it activates a striker (not shown) that strikes the primer 18 and activates the dual activation mode thermal battery 10 by igniting the heat source 30 of the 4-cell section 40.

Further, the 4-cell section 40 is configured to provide electrical voltage. In certain embodiments, the electrical voltage produced by the 4-cell section 40 can indicate occurrence of predefined conditions. In accordance with some embodiments, the predefined conditions can include proximity of a munition to an entity such as an aircraft. In some embodiments, the munition can be a both Laser-guided system and a GPS-guided system. In alternate embodiments, the load can be a guided weapon system mounted on an automobile such as an aircraft.

Further, the 18-cell section 42 of the dual activation mode thermal battery 10 can be activated by the electrical output of the 4-cell section 40 or by external electrical stimuli. In certain embodiments, the 18-cell section can be activated by using the second initiator such as the squib 20. The electrical voltage provided by the 4-cell section 40 can be used to activate the 18-cell section 42 of the dual activation mode thermal battery 10. When the electrical voltage is applied to the squib terminals 32a and 32b, the squib 20 explodes and generates thermal energy that ignites the heat source 30 within the 18-cell section 42. The ignition of the heat source 30 activates the electrolytes in order to activate the 18-cell section 42 of the dual activation mode thermal battery 10. The squib 20 produces an electrical voltage that can be used to power a load. In accordance with some embodiments, the 4-cell section 40 and the 18-cell section 42 are electrically and thermally isolated by the insulator 22 and the insulator 22 prevents the thermal output of one of the initiators from directly activating both cell stacks. In alternate embodiments, the 4-cell section 40 and the 18-cell section 42 are electrically isolated by the insulator 22. In some other embodiments, the 4-cell section 40 and the 18-cell section 42 are electrically and thermally isolated by the insulator 22.

III. Operation of the Dual Activation Mode Thermal Battery

FIG. 2 illustrates the cells in the thermal battery 10 in a first configuration for powering a load. The disclosed subject matter entails the dual activation mode thermal battery 10 capable of activation through both mechanical stimuli and electrical stimuli. Sections of the cells 12 such as 4-cell section 40 and the 18-cell section 42 are shown for illustration purposes only. The dual activation mode thermal battery 10 can be defined as a power source that is formed by combining two different power sources to provide power to the load. In some embodiments, the load can include a Laser-guidedsystem and a GPS-guidedsystem. The Laser system and the GPS system are used to navigate the weapon system to a target. In certain embodiments, the load can be a weapon system mounted on an entity such as but not limited to, an aircraft, a military vehicle, a submarine, etc. However, the various embodiments are intended to include or otherwise cover any configuration of a vehicle that may be beneficial to carry the load. In other words, the load can be an integral or unitary with the vehicle. The various embodiments are further intended to include or otherwise cover any vehicular and or non-vehicular entities that may be beneficial to carry the load.

For purposes of the description of the embodiments, it is assumed that a first section of the cells 12 can be made up by arranging the cells 12 in a stack assembly. In some embodiments, the first power source can be a 4-cell section 40. The various embodiments are further intended to include or otherwise cover any number of cells stacked one over another that may be beneficial for providing electrical voltage. In some embodiments, the 4-cell section 40 can be activated by using the primer 18. As discussed, the 4-cell section 40 can be activated by activating the primer 18 activated by mechanically striking a striker (not shown). When the striker strikes the primer 18, the primer 18 detonates and further ignites the 4-cell section 40 of the thermal battery 10. Once activated, the 4-cell section 40 provides electrical voltage to the squib 20 to initiate the 18-cell section 42 and provides voltage that can be used by the safety system for a munition.

Further, the electrical voltage provided by the 4-cell section 40 can be used to activate the 18-cell section 42 of the dual activation mode thermal battery 10. For purposes of the description of the embodiments, it is assumed that the 18-cell section 42 can be made up of by arranging the cells 12 in a stack assembly. In some embodiments, the 18-cell section 42 can be made up of 18 cells. The various embodiments are further intended to include or otherwise cover any number of cells stacked one over another that may be beneficial for providing electrical voltage to a load. The electrical voltage produced by the 4-cell section 40 can be used to activate the 18-cell section 42. Further, the 4-cell section 40 also provides an electrical voltage signal that indicates that the primer 18 in the 4-cell section 40 has been struck and activated.

In certain embodiments, the 18-cell section 42 can be activated directly through electrical stimuli. In some embodiments, the 18-cell section 42 can be activated directly by applying outside power directly to the squib 20. The outside power applied to the squib 20 can activate the electrolyte within the separator 28 of the squib 20, which further activates the 18-cell section 42 of the dual activation mode thermal battery 10. Therefore, a main part that is the18-cell section 42 of the dual activation mode thermal battery 10 is activated. However, in case, when the 18-cell section 42 is activated using the electrical stimuli, the 4-cell section 40 is not activated. A safety control signal can then be provided to a controller (not shown), which indicates that the primer 18 had not been struck. In some embodiments, the primer 18 can only be struck, in this case, when the dual activation mode thermal battery 10 is separated from a platform. For example, when a load is separated from a launch platform then the primer 18 of the dual activation mode thermal battery 10 is activated by, but not limited to, using lanyard, etc. Therefore, the electrical voltage generated by the 4-cell section 40 can be used as a safety control signal to determine whether the load has been detached from the entity.

In certain embodiments, the 4-cell section 40 and 18-cell section 42 of the dual activation mode thermal battery 10 are electrically and thermally isolated in a manner such that an ignition source such as the heat source 30 cannot directly activate the other power sources of the dual activation mode thermal battery 10. For example, as discussed above, the mechanical activation of the 4-cell section 40 of the dual activation mode thermal battery 10 can initiate electrical activation of the 18-cell section 42 of the dual activation mode thermal battery 10.

In certain embodiments, the electrical voltage produced by the 4-cell section 40 can indicate occurrence of predefined conditions. In accordance with some embodiments of the disclosed subject matter, the predefined conditions can include proximity of a load to an entity, such as an aircraft, a military vehicle, an electronic device, etc.

Figure 3:
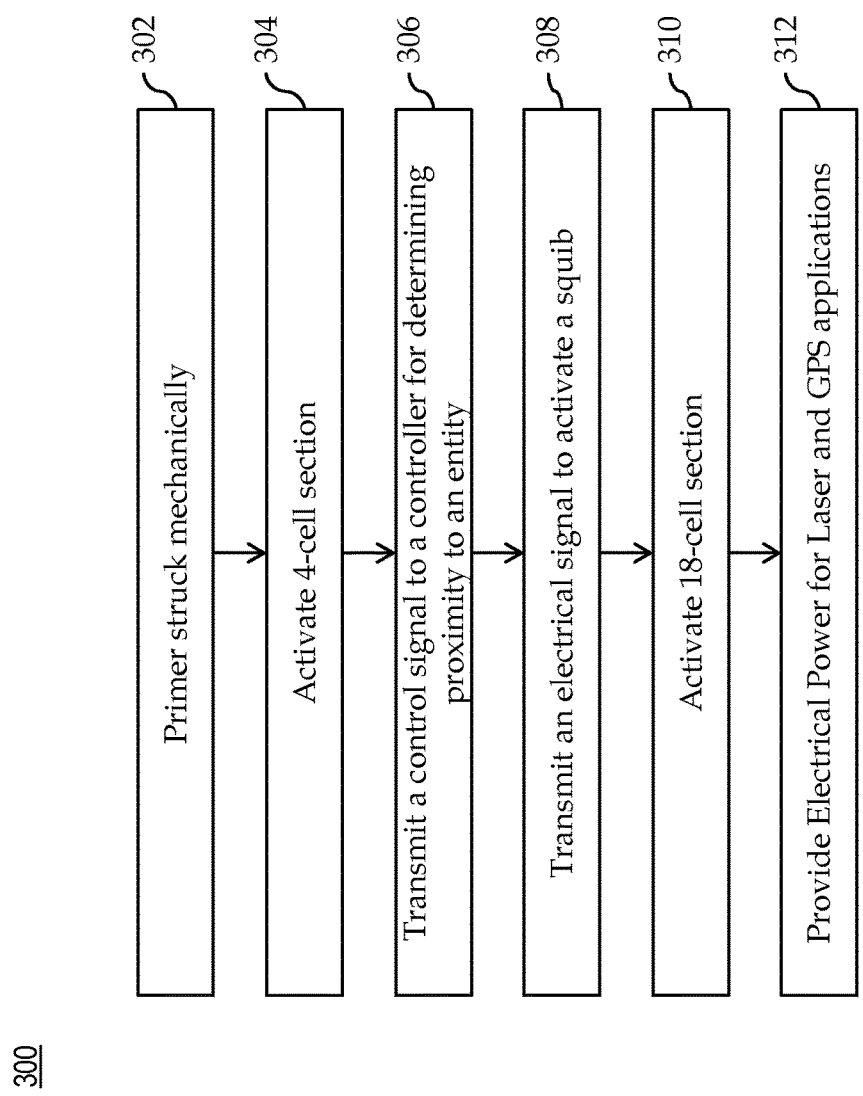
FIG. 3 is a flowchart of an exemplary procedure for activating the dual activation mode thermal battery.

FIG. 3 is a flowchart of an exemplary procedure for activating the dual activation mode thermal battery. At step 302, a primer is struck mechanically. As discussed in detail above, the primer can be struck by pulling a lanyard, or by using a striker, etc. When the primer is struck, it explodes and generates thermal energy.

At step 304, the 4-cell section of the dual activation mode thermal battery 10 is activated upon receiving the generated thermal energy. Thereafter, at step 306, the 4-cell section transmits a control signal to a controller to determine proximity of a load to an entity. The proximity between the load, in which the thermal battery is disposed, and an entity such as, but not restricted to, an aircraft, electronic device, etc. is determined.

Further, at step 308, the 4-cell section transmits an electrical signal to a squib in the dual activation mode thermal battery 10. The electrical signal activates the squib, which further produces thermal energy. The thermal energy is then used to ignite heat source within the thermal battery 10. When the heat source is ignited, the 18-cell section of the dual activation mode thermal battery 10 is activated, at step 310.

Further, at step 312, the dual activation mode thermal battery 10 can provide power for Laser applications and GPS applications disposed within the load.

Figure 4:
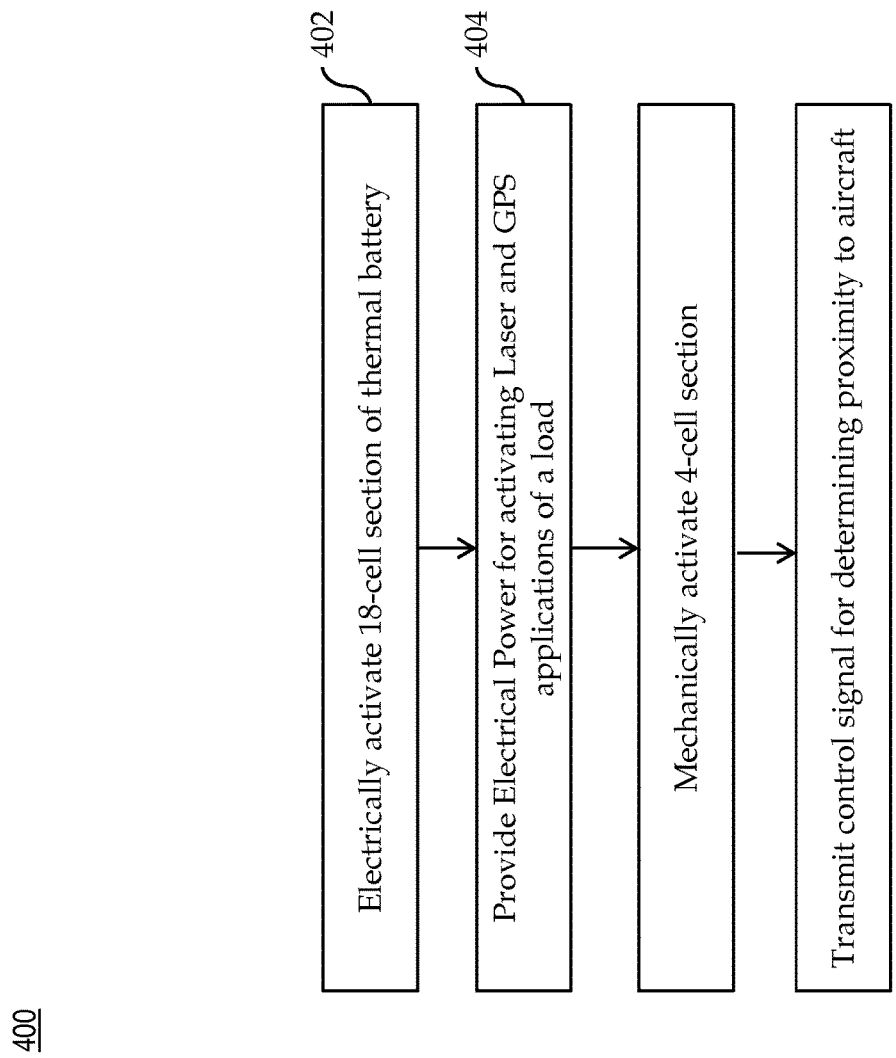
FIG. 4 is a flowchart of another exemplary procedure for activating the dual activation mode thermal battery.

FIG. 4 is a flowchart of another exemplary procedure for activating the dual activation mode thermal battery. At step 402, the second power source that is 18-cell section 42 of the dual activation mode thermal battery can be activated electrically. In some embodiments, the 18-cell section 42 can be activated by directly providing external electrical voltage to the dual activation mode thermal battery. When the 18-cell section 42 is activated, voltage is generated to power the munition guidance system. Further, at step 404, when the munition is released from the aircraft, the 4 cell section 40 is mechanically-activated by a percussion primer or similar device and a control signal can be transmitted to the munition safety system.

IV. Determination of Proximity to an Aircraft

In exemplary embodiments, the dual activation mode thermal battery 10 can be disposed within a load attached to an aircraft. In some embodiments, the load can be a guided weapon system mounted on an aircraft, military vehicle, submarine, etc. In certain embodiments, the load can include a Laser system and a GPS system for guiding and/or navigating the load to a target. However, the various embodiments are intended to include or otherwise cover any configuration of a vehicle that may be beneficial to carry the load. In other words, the load can be an integral or unitary with the vehicle. The various embodiments are further intended to include or otherwise cover any vehicular and or non-vehicular objects that may be beneficial to carry the load.

The dual activation mode thermal battery 10, as discussed in detail above, can be activated in two modes. The dual activation mode thermal battery 10 can include a plurality of power sources in order to provide electrical power to the load. In some embodiments, the dual activation mode thermal battery 10 can be integral or unitary with the load. In some embodiments, a first power source of the dual activation mode thermal battery 10 can be activated through mechanical stimuli. In certain embodiments, a first power source of the dual activation mode thermal battery 10 can be activated by mechanically striking the primer 18. The primer 18 thermal energy output has an ignition path to the heat source 30 and to a striker in a striker assembly (not shown). When the striker is struck with an appropriate velocity, the primer 18 explodes and provides ignition to the heat source 30 to activate the first power source of the dual activation mode thermal battery 10.

In alternative embodiments, the primer 18 can be detonated by pulling a lanyard attached to the load. For example, a mechanical device is used to strike the primer 18. The mechanical device can include a firing pin that can be struck manually by pulling a lanyard using a pull ring (not shown). In some other embodiments, the primer 18 of the dual activation mode thermal battery 10 that can be activated mechanically by dropping the load away from the aircraft. For example, when the load is dropped away from the aircraft, it activates a striker that strikes the primer 18 and activates the first power source of the dual activation mode thermal battery 10 by igniting the heat source 30.

Once the first power source of the dual activation mode thermal battery 10 is activated, a control signal is generated by the first power source. The control signal is then transmitted to a controller to determine proximity of the load to the aircraft. This means, the proximity of the load from the aircraft is determined to indicate whether the load is launched from a launch platform of the aircraft. In some embodiments, the control signal produced by the first power source of the dual activation mode thermal battery 10 can be used as a sensor to determine the proximity of the load to the aircraft.

Further, the first power source that is activated by the primer 18 is configured to produce electrical voltage. In certain embodiments, the electrical voltage can be used to activate a guidance system, disposed within the load, safely away from the aircraft. In some embodiments, the guidance system is integral or unitary with the load. The guidance system can be used to guide the load, such as a weapon system to navigate to a target.

In certain embodiments, the electrical voltage provided by the first power source can indicate occurrence of predefined conditions. In accordance with some embodiments, the predefined conditions can include proximity of a load to an object such as an aircraft. In some embodiments, the load can be a Laser guided system and a GPS guided system. In alternate embodiments, the load can be a weapon system mounted on an aircraft.

V. Industrial Applicability

In exemplary embodiments, it is necessary to determine proximity of a load to an aircraft to which the load is attached. In certain embodiments, the load is a weapon system. For example, the load is a munition attached to the aircraft. As discussed, the load can be activated by a dual activation mode thermal battery. The dual activation mode thermal battery 10 can also be used to provide a voltage signal to the munition system that senses proximity of the load to the aircraft.

Figure 5:
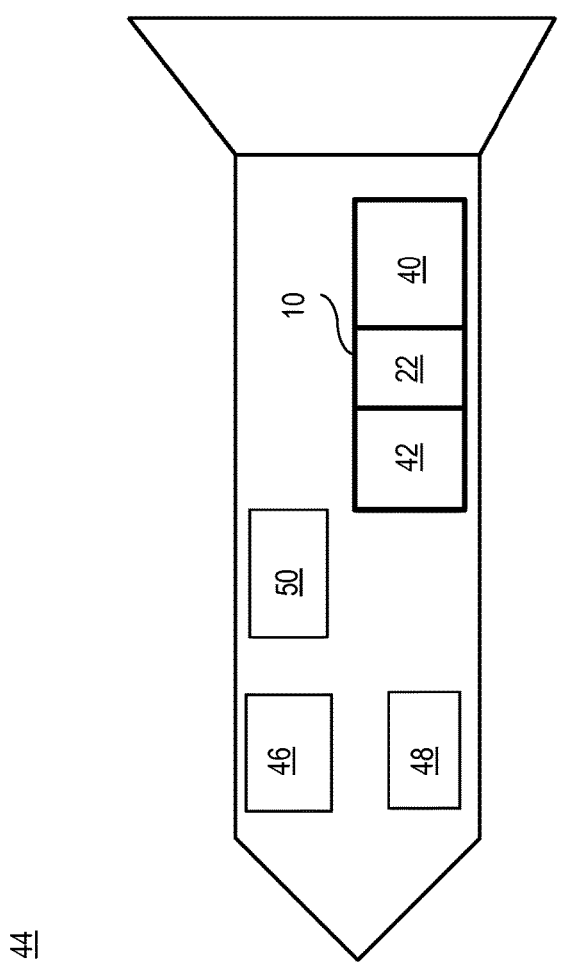
FIG. 5 is an exemplary view of a weapon system in accordance with the disclosed subject matter.

FIG. 5 illustrates an exemplary weapon system wherein the dual activation mode thermal battery 10 of the disclosed subject matter is disposed, in accordance with the embodiments. In the disclosed subject matter, the dual activation mode thermal battery 10 is disposed within a munition 44 attached to an aircraft (not shown). In some embodiments, the munition 44 can include a number of elements such as, but not restricted to, a control panel 46, a Laser guided application 48, a GPS guided application 50, etc. The control panel 46 can be used to control various components of the munition 44. In some embodiments, the control panel 46 can be used to control speed of the munition 44. In alternate embodiments, the control panel 46 can be used to control target-detecting device within the munition 44. In some another embodiments, the control panel 46 can be used to control electrical motors of the munition 44. In some embodiments, the Laser guided application 48 can be used to guide the munition 44 to a target. In certain embodiments, the GPS guided application 50 can be used to guide and/or navigate the munition 44 to the target.

The dual activation mode thermal battery 10 can be capable of activation through mechanical and electrical stimuli. A first power source of the dual activation mode thermal battery 10 is a 4-cell section 40. The 4-cell section 40 can be activated through mechanical stimuli. In some embodiments, the 4-cell section 40 of the thermal battery 10 can be activated mechanically by dropping the load away from the aircraft. When the munition 44 is dropped, a lanyard attached to the munition 44 is pulled when the munition 44 is dropped from the aircraft. The lanyard attached to the munition 44 activates a firing pin that struck and detonates the primer 18, which further produces a control signal. The control signal can indicate that the 4-cell section 40 is struck and activated. Further, the control signal can be used to determine proximity of the munition 44 to the aircraft. Therefore, when the 4-cell section 40 of the dual activation mode thermal battery 10 is activated, then it can be determined that the munition 44 is away from the aircraft.

Further, electrical voltage is produced by the 4-cell section 40, which can be used to activate 18-cell section 42 of the dual activation mode thermal battery 10. In some embodiments, the electrical voltage produced from the 4-cell section 40 can be provided to an electrical initiator of the 18-cell section 42 of the dual activation mode thermal battery 10. In alternate embodiments, the electrical power produced from the 4-cell section 40 can be provided to a squib 20 of the of the 18-cell section 42 of the dual activation mode thermal battery 10. In some embodiments, the 18-cell section 42 can be activated by applying outside power directly to the squib 20. However, when the 18-cell section is activated directly, the 4-cell section is inactive. The status of the 4-cell section 40 can indicate that the primer 18 had not been struck. In this case, the primer 18 can only be struck when the munition 44 gets separated from a launch platform of the aircraft. The activation of the 18-cell section 42 of the thermal battery 10 can produce the electrical voltage that can be provided to the Laser guided applications 48 and/or GPS guided applications 50. When the 4-cell section 40 gets activated, it determines that the munition 44 can now be navigated to a target by using the Laser guided application 48 and the GPS guided application 50.

The dual activation mode thermal battery 10 in the disclosed subject matter can be used in a number of applications. In some embodiments, the dual activation mode thermal battery 10 can be used for military purposes. For example, the dual activation mode thermal battery 10 can be used to provide electrical power to the military weapon systems such as, but not limited to, missiles, munitions, laser guided bombs, etc.

In certain embodiments, the dual activation mode thermal battery 10 can be used to provide electrical power in missile weapon systems for guidance control, telemetry, object tracking, flight termination, actuator systems etc. The usage of thermal battery 10 described above for missile purposes can provide various advantages, such as, safety, high energy density, long shelf life, flexible configurations, etc.

In certain embodiments, the dual activation mode thermal battery 10 can be used in aerospace applications that require long shelf life and maintenance free shelf life. In addition, the dual activation mode thermal battery 10 can be used in the aerospace applications that provide required power in a range of temperatures, climates, and dynamic environments. In such applications, the dual activation mode thermal battery 10 came out to be as a cost effective device.

In some other embodiments, the dual activation mode thermal battery 10 can be used in mining industries for drilling operations.

In yet other embodiments, the dual activation mode thermal battery 10 can be used for space and satellite missions. The dual activation mode thermal battery 10 disclosed can be used in manned and/or unmanned vehicles used in the used for space and satellite missions.

VI. Alternate Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of a dual activation mode thermal battery. However, the disclosed dual activation mode thermal battery can be disposed at any location within a load that is beneficial to provide electrical voltage to the load and its components. In fact, the disclosed dual activation mode thermal battery can be configured to provide electrical voltage to a load to determine proximity of the load to an aircraft. Further, the disclosed dual activation mode thermal battery can be configured to provide electrical voltage for activating Laser guided applications and GPS guided applications. The load can be a weapon system attached to an aircraft. Any and all of the elements of the dual mode thermal battery can be formed in any shape and size to accommodate different locations within the dual activation mode thermal battery.

The dual activation mode thermal battery disclosed above includes a set of components (such as 4-cell section and 18-cell section) that are disposed within a housing of a battery case of the dual activation mode thermal battery. However, embodiments are intended to cover the dual activation mode thermal battery that can include cell sections having different number of cells.

Certain methods of activating a second section that is 18-cell section of the dual activation mode thermal battery are disclosed above in the context of providing an electrical power to a load. However, embodiments are intended to include alternative activation of the dual activation mode thermal battery that can activate a second portion of the dual activation mode thermal battery through electrical stimuli. In alternative embodiments, the second portion of the dual activation mode thermal battery can be activated by electrical voltage provided by the first cell section that is 4-cell section.

In the above embodiments, a dual activation mode thermal battery is described in the context of the load. However, are intended to include two or more dual activation mode thermal batteries cooperating together.

Exemplary embodiments are intended to include or otherwise cover any appropriate type of materials of construction appropriate for elements of the dual activation mode thermal battery disclosed above.

Exemplary embodiments are also intended to cover any additional or alternative elements of the dual activation mode thermal battery disclosed above. Exemplary embodiments are further intended to cover omission of any elements of the dual activation mode thermal battery disclosed above.

Embodiments are disclosed above in the context of manual activation of dual activation mode thermal battery. However, embodiments are intended to cover methods and apparatus for automatically activating the dual activation mode thermal battery including mechanisms that use or otherwise include processors, software, etc.

Embodiments are disclosed above in the context of providing power to a load. The load can be a weapon system. In alternative embodiments, the load can be a Laser-guidedsystem. In yet other embodiments, the load can be GPS system such as GPS guided applications. In some embodiments, the load can be a missile, munitions, etc.

Embodiments are disclosed above in the context of a load. However, embodiments are intended to cover other application for weapon systems having similar capabilities.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A dual activation mode thermal battery for powering a load, the thermal battery comprising:

a first power source that is activated upon receiving mechanical energy, wherein the first power source provides a voltage in response to proximity of the load to an entity;

a second initiator that generates thermal energy upon receiving the voltage from the first power source; and a second power source that is configured to provide dual activation of the thermal battery, and wherein:

the second power source is further configured to be activated through electrical power produced by the first power source; and the second power source is further configured to be activated based on the thermal energy generated by the second initiator; and the second power source is configured to, upon activation, provide a voltage for powering the load, and wherein the first power source and the second power source are thermally insulated and ignition of the first power source is electrically isolated from the second power source and ignition of the second power source is electrically isolated from the first power source.

2. The thermal battery of claim 1, further including a first initiator disposed nearby the first power source, wherein the first initiator receives mechanical stimuli to generate the thermal energy for activating the first power source.

3. The thermal battery of claim 1, wherein the entity includes at least one of a land vehicle, an air vehicle, and a marine vehicle.

4. The thermal battery of claim 1, further including a plurality of electrodes electrically connected to the second power source, wherein the electrodes provide the voltage to the load.

5. The thermal battery of claim 4, wherein the plurality of electrodes includes at least one positive electrode, at least one negative electrode, and at least one separator.

6. The thermal battery of claim 1, wherein the first power source and the second power source are electrically isolated.

7. The thermal battery of claim 1, wherein the load includes at least one of a Laser-guided system and a Global Positioning System (GPS) system.

8. The thermal battery of claim 1, wherein the load is a weapon system mounted on the entity, wherein the entity includes at least one of a land vehicle, an air vehicle, and a marine vehicle.

9. A dual activation mode thermal battery for powering a load, the thermal battery comprising:

a first power source activable upon receiving mechanical energy, wherein the first power source provides a voltage in response to a proximity of the load to an entity;

a second initiator that generates thermal energy upon receiving the voltage from the first power source; and a second power source that is configured to provide dual activation of the thermal battery, and wherein:

the second power source is further configured to be activated through electrical power produced by the first power source; and the second power source is further configured to be activated based on the thermal energy generated by the second initiator, and the second power source is configured to, upon activation provide a voltage for powering the load, and wherein the first power source and the second power source are thermally insulated and ignition of the first power source is electrically isolated from the second power source and ignition of the second power source is electrically isolated from the first power source, and a plurality of electrodes electrically connected to the second power source, wherein the electrodes provide the voltage to the load.

10. The thermal battery of claim 9, further including a first initiator disposed nearby the first power source, wherein the first initiator receives mechanical stimuli to generate the thermal energy for activating the first power source.

11. The thermal battery of claim 10, wherein the entity includes at least one of a land vehicle, an air vehicle, and a marine vehicle.

12. The thermal battery of claim 9, wherein the first power source and the second power source are electrically isolated.

13. The thermal battery of claim 9, wherein the plurality of electrodes including at least one positive electrode, at least one negative electrode, and at least one separator.

14. The thermal battery of claim 9, further including a battery case to enclose the first power source, the second power source, and the plurality of electrodes.

15. The thermal battery of claim 9, wherein the load includes at least one of a Laser-guided system and a Global Positioning System (GPS) system.

16. The thermal battery of claim 9, wherein the load is a weapon system mounted on an entity, wherein the entity includes at least one of a land vehicle, an air vehicle, and a marine vehicle.

* * * * *